R. J. PESCHMAN.
CIRCUIT CLOSING VALVE FOR INTERNAL COMBUSTION ENGINES.
APPLICATION FILED AUG. 6, 1915.

1,202,577.

Patented Oct. 24, 1916.

WITNESSES:
S. E. Wade
H. E. Beck

INVENTOR
Rudolph J. Peschman

BY Munn & Co.

ATTORNEYS

UNITED STATES PATENT OFFICE.

RUDOLPH JAMES PESCHMAN, OF FORT SHERIDAN, ILLINOIS.

CIRCUIT-CLOSING VALVE FOR INTERNAL-COMBUSTION ENGINES.

1,202,577.  Specification of Letters Patent.  Patented Oct. 24, 1916.

Application filed August 6, 1915. Serial No. 43,965.

*To all whom it may concern:*

Be it known that I, RUDOLPH J. PESCHMAN, a citizen of the United States, and a resident of Fort Sheridan, in the county of Lake and State of Illinois, have invented a new and useful Improvement in Circuit-Closing Valves for Internal-Combustion Engines, of which the following is a specification.

My invention is an improvement in circuit closing valves for internal combustion engines, and the invention has for its object to provide a valve of the character specified, for use in multi-cylinder internal combustion engines to indicate failure in the operation of any particular cylinder.

Figure 1:
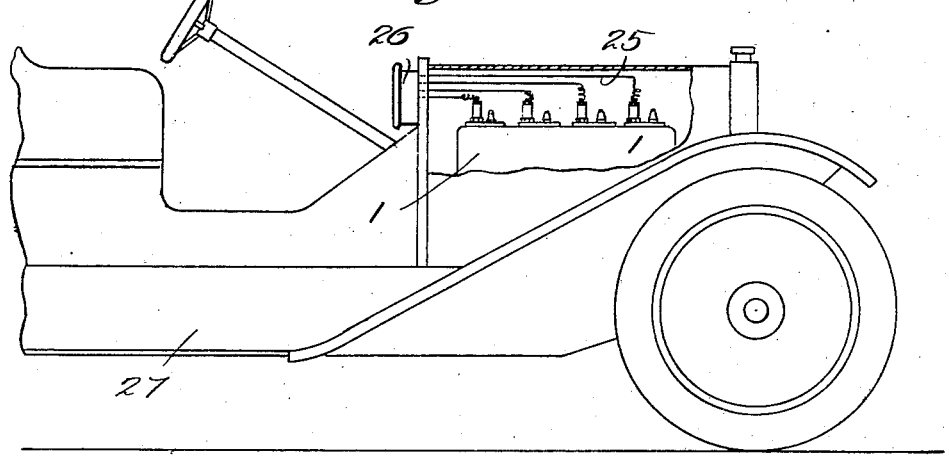
Figure 2:
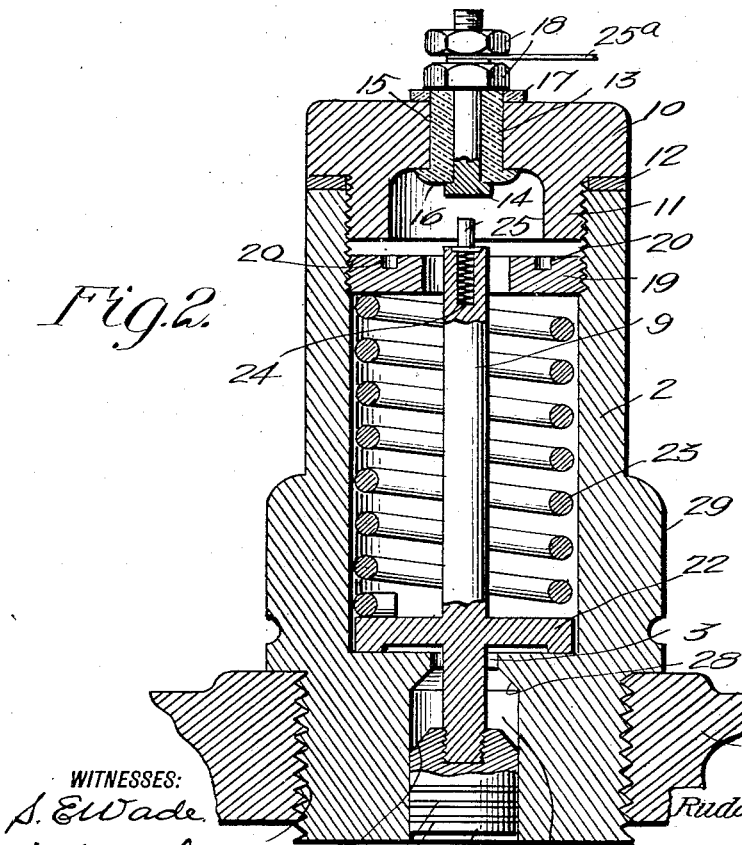

In the drawings:—Figure 1 is a partial side view of an internal combustion engine provided with the improved valve, and Fig. 2 is a vertical section through the valve.

The present embodiment of the invention is shown in connection with the engine of an automobile, and each of the cylinders 1 of the engine is provided with one of the indicating valves. The valve comprises a substantially cylindrical casing 2, having its lower end partially closed and provided with a port 3. The port 3 is spaced inwardly from the adjacent end of the cylinder and the cylinder has an axial passage 4 beyond the port.

A piston 5 is arranged within the passage 4, and this piston has piston rings 6 of ordinary form to make a fluid tight joint. The end of the cylinder adjacent to the passage 4 is externally threaded as indicated at 7, for engaging an internally threaded opening in the outer end of the cylinder 1. A stem 9 has threaded engagement with the inner end of the piston 5, and the stem passes through the port 3 to near the opposite end of the casing 2, and the said opposite end is closed by a head 10, the head having a reduced nipple 11, which is threaded into the internally threaded end of the casing 2, a packing ring or gasket 12, being arranged between the head and the adjacent end of the cylinder.

The head has a central opening 13, in which is arranged a binding post 14, and an insulating sleeve 15 encircles the binding post insulating the post from the head 10. The sleeve 15 has a marginal flange 16 at its inner end and a washer 17 of insulating material encircles the sleeve outside the head, the washer being held in place by lock nuts 18, threaded on to the post.

The internally threaded portion of the casing 2 is of greater length than the nipple 11, and a head 19 is threaded into the end of the casing adjacent to the head 10. This head 19 has openings 20 for engagement by a spanner or the like to turn the head, and the head has also a central opening 21, for a purpose to be later described.

The stem 9 is provided with an integral head 22, which forms a seat for one end of a coil spring 23, the other end of the spring bearing against the seat or head 19, and the seat 22 is adjacent to the port 3. That end of the stem 9 remote from the piston 5 passes through the central opening 21 of the head or seat 19, and this end of the stem is provided with an axial opening in which is arranged a coil spring 24.

A contact point 25 is held in the end of the stem, the said point sliding in a guide at its inner end, and the outer end of the recess containing the spring 24 is counterbored or rabbeted to receive the guide for the contact point. The spring bears against the end of the contact point, and this point is intended to engage with the inner end of the binding post 14 under conditions to be presently described.

A conducting wire 25ª is connected at one end with the binding post 14, of each cylinder, and the other end of each of the wires 25ª leads to a suitable electrical indicating device 26, which is arranged adjacent to the engine, as for instance, when the device is used in automobiles on the dash board of the automobile 27.

The operation of the improved valve is as follows:—On the explosion stroke of the engine the piston 5 will be forced upwardly, compressing the spring 23, and the contact point 25 will contact with the inner end of the binding post 14, closing the circuit of which the conducting wire 25 is a part. Should for any reason, while the engine is running, one or more of the engine cylinders miss or fail to explode for any reason, a glance at the indicator will immediately show which of the cylinders is in trouble.

It is obvious that with proper indicating mechanism the valve might be used to indicate whether or not all of the engine cylinders were delivering their full horse power capacity. The upper end of the piston is beveled as indicated at 27 to fit the bevel under face 28 of the seat, and the casing 2 has a polygonal enlargement 29 at its lower end for permitting the casing to be engaged with or disengaged from the cylinder.

The tension of the spring 23 may be adjusted by means of the head or washer 19, turning the said head or washer upward or downward, as may be desired. The tension of the spring 23 is sufficient to prevent any action on the piston 5 by the compression stroke of the engine, the piston being operated only on the explosion stroke.

The electrical indicating device is an annunciator of ordinary construction for indicating the contact of the members 25 and 14. The contact member 25 is normally pressed outward by the spring but may yield when it engages the binding post to prevent injury to the parts. The bevel surface 28 is a limiting member for engagement by the inner end of the piston to limit the movement of the piston away from the engine.

I claim:—

1. A circuit closing valve for internal combustion engines, each valve comprising a casing communicating with the cylinder, a piston in each casing and adapted to be moved outward away from the cylinder by the explosion stroke, a spring normally pressing the piston inward, means for varying the tension of the spring, said means comprising a head at the outer end of the spring and having threaded engagement with the casing, a binding post held at the outer end of the casing and insulated therefrom and adapted for connection with an annunciator, and a spring supported contact member slidably connected to the piston and adapted to engage the binding post on the explosion stroke of the engine.

2. A circuit closing valve for internal combustion engines, comprising a casing adapted to communicate with the cylinder and having at its outer end a binding post, a piston movable in the casing and adapted to be moved outward by the explosion, a stem connected with the piston and having a seat, a head threaded into the outer end of the casing and having an opening through which the stem extends, and a coil spring arranged between the head and the seat for holding the piston against movement during the compression stroke, said piston having a contact member for coöperating with the binding post.

3. A circuit closing valve for internal combustion engines, comprising a casing adapted to communicate with the cylinder, a piston movable in the casing and having a stem, a binding post in connection with the casing at the outer end of the stem, a contact member mounted to slide in the stem and to engage the binding post, and a spring normally pressing the said member outward.

RUDOLPH JAMES PESCHMAN.

Witnesses:
O. S. Gooch,
Fred Dengler.